(12) United States Patent
Padgett et al.

(10) Patent No.: US 9,989,343 B2
(45) Date of Patent: *Jun. 5, 2018

(54) BASE INSERT FOR POLYMER AMMUNITION CARTRIDGES

(71) Applicant: PCP Tactical, LLC, Vero Beach, FL (US)

(72) Inventors: Charles Padgett, Vero Beach, FL (US); Sy Wiley, Orlando, FL (US)

(73) Assignee: PCP Tactical, LLC, Vero Beach, FL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/463,906

(22) Filed: Mar. 20, 2017

(65) Prior Publication Data
US 2017/0191812 A1 Jul. 6, 2017

Related U.S. Application Data

(60) Continuation of application No. 14/482,843, filed on Sep. 10, 2014, now Pat. No. 9,599,443, which is a (Continued)

(51) Int. Cl.
*F42B 5/307* (2006.01)
*F42C 19/08* (2006.01)
(Continued)

(52) U.S. Cl.
CPC ............ *F42C 19/083* (2013.01); *B29C 65/72* (2013.01); *B29C 69/001* (2013.01); *F42B 3/24* (2013.01);
(Continued)

(58) Field of Classification Search
CPC .. F42B 5/30; F42B 5/307; F42B 5/313; F42B 5/00; F42B 5/02; F42B 5/18; F42B 5/181;
(Continued)

(56) References Cited

U.S. PATENT DOCUMENTS 546,936 A * 9/1895 Pinfold ...................... F42B 5/26
102/469
692,819 A 2/1902 Bissel
(Continued)

FOREIGN PATENT DOCUMENTS

GB 2092274 8/1982

*Primary Examiner* — Derrick R Morgan
(74) *Attorney, Agent, or Firm* — Troutman Sanders LLP

(57) ABSTRACT

An insert for a high strength polymer-based cartridge casing can include an outside, an inside formed within the insert, and a back end disposed at a rear of the cartridge casing. The back end includes a rim and groove disposed around the outside of the insert and a primer pocket disposed inside the back end. Also included is a front end, opposite the back end, having an overmolded area disposed around the outside of the insert above the primer pocket and a basin, having a depth, formed inside the overmolded area. A flash hole can be included inside the insert and communicating between the primer pocket and the basin. The flash hole has a perimeter and a ring disposed around the perimeter of the flash hole, including a height starting at a bottom of the basin, disposed toward the front end, and less than the depth of the basin.

2 Claims, 11 Drawing Sheets

Related U.S. Application Data continuation of application No. 14/460,877, filed on Aug. 15, 2014, now Pat. No. 9,194,680, and a continuation of application No. 14/041,709, filed on Sep. 30, 2013, and a continuation of application No. 13/350,585, filed on Jan. 13, 2012, and a continuation of application No. 13/865,040, filed on Apr. 17, 2013, now Pat. No. 8,875,633, which is a division of application No. 13/350,607, filed on Jan. 13, 2012, now Pat. No. 8,443,730, said application No. 14/460,877 is a division of application No. 13/836,192, filed on Mar. 15, 2013, now Pat. No. 8,807,008, which is a continuation-in-part of application No. 13/350,607, filed on Jan. 13, 2012, now Pat. No. 8,443,730, said application No. 14/041,709 is a continuation of application No. 12/847,319, filed on Jul. 30, 2010, now Pat. No. 8,573,126.

(60) Provisional application No. 61/555,684, filed on Nov. 4, 2011, provisional application No. 61/532,044, filed on Sep. 7, 2011, provisional application No. 61/509,337, filed on Jul. 19, 2011, provisional application No. 61/433,170, filed on Jan. 14, 2011.

(51) Int. Cl.
| | | |
|---|---|---|
| *F42B 5/313* | (2006.01) | |
| *F42B 3/24* | (2006.01) | |
| *F42B 5/30* | (2006.01) | |
| *F42B 33/00* | (2006.01) | |
| *B29C 65/72* | (2006.01) | |
| *B29C 69/00* | (2006.01) | |
| *F42C 19/10* | (2006.01) | |
| *B29K 96/00* | (2006.01) | |
| *B29L 31/00* | (2006.01) | |

(52) U.S. Cl.
CPC ............... *F42B 5/30* (2013.01); *F42B 5/307* (2013.01); *F42B 5/313* (2013.01); *F42B 33/00* (2013.01); *F42C 19/10* (2013.01); *B29K 2096/00* (2013.01); *B29L 2031/7772* (2013.01)

(58) Field of Classification Search
CPC .......... F42B 5/182; F42B 5/188; F42B 5/192; F42B 5/26; F42B 5/28; F42B 5/285; F42B 5/295; F42B 5/297
USPC ....... 102/432, 431, 430, 439, 464, 465, 466, 102/467, 469, 470
See application file for complete search history.

(56) References Cited

U.S. PATENT DOCUMENTS

| | | | |
|---|---|---|---|
| 827,600 A | 7/1906 | Bailey | |
| 980,351 A * | 1/1911 | Sherman et al. ......... | F42B 5/26 102/469 |
| 1,118,888 A | 11/1914 | Butler | |
| 1,233,071 A | 7/1917 | Lindquist | |
| 1,292,359 A * | 1/1919 | Nelson ...................... | F42B 5/26 102/469 |
| 2,022,685 A | 12/1935 | Moore | |
| 2,263,941 A | 11/1941 | George | |
| 2,294,822 A | 9/1942 | George | |
| 2,366,887 A | 1/1945 | Ge | |
| 2,379,510 A | 7/1945 | Ewart | |
| 2,395,460 A | 2/1946 | Carten | |
| 2,401,050 A | 5/1946 | Cooper et al. | |
| 2,402,068 A | 6/1946 | Meador | |
| 2,435,590 A | 2/1948 | Holroyd | |
| 2,455,080 A | 11/1948 | Miller et al. | |
| 2,481,726 A | 9/1949 | Muschamp | |
| 2,648,258 A | 8/1953 | Simpson | |
| 2,654,319 A * | 10/1953 | Roske ...................... | F42B 5/307 102/467 |
| 2,862,446 A | 8/1955 | Ringdal | |
| 2,915,947 A | 12/1959 | Heeley | |
| 2,918,868 A | 12/1959 | Ringdal | |
| 2,995,090 A | 8/1961 | Daubenspeck | |
| 3,034,433 A * | 5/1962 | Gronn ...................... | F42B 5/295 102/464 |
| 3,078,765 A | 2/1963 | Falcone et al. | |
| 3,099,958 A * | 8/1963 | Daubenspeck ........... | F42B 7/06 102/449 |
| 3,123,003 A | 3/1964 | Lange, Jr. et al. | |
| 3,144,827 A | 8/1964 | Boutwell et al. | |
| 3,170,401 A * | 2/1965 | Johnson ................... | F42B 5/18 102/467 |
| 3,233,546 A * | 2/1966 | Foote ....................... | F42B 7/06 102/451 |
| 3,288,066 A * | 11/1966 | Stadler .................... | F42B 5/38 102/430 |
| 3,333,506 A | 8/1967 | Henshaw et al. | |
| 3,336,871 A | 8/1967 | Quinlan | |
| 3,424,089 A * | 1/1969 | Humpherson .... | B29C 45/14336 102/466 |
| 3,485,170 A | 12/1969 | Scanlon | |
| 3,609,904 A | 10/1971 | Scanlon | |
| 3,650,176 A | 3/1972 | Lindner | |
| 3,659,528 A | 5/1972 | Santala | |
| 3,706,260 A | 12/1972 | Rausing | |
| 3,726,218 A | 4/1973 | Austin, Jr. | |
| 3,745,924 A | 7/1973 | Scanlon | |
| 3,749,020 A | 7/1973 | Weyhmuller | |
| 3,749,023 A | 7/1973 | Kawaguchi et al. | |
| 3,785,293 A | 1/1974 | Barr | |
| 3,797,396 A | 3/1974 | Reed | |
| 3,808,974 A | 5/1974 | Herter | |
| 3,818,834 A | 6/1974 | Baumgartener | |
| 3,830,157 A | 8/1974 | Donnard et al. | |
| 3,842,739 A | 10/1974 | Scanlon et al. | |
| 3,855,686 A | 12/1974 | Snyder | |
| 3,874,294 A | 4/1975 | Hale | |
| 3,913,445 A | 10/1975 | Grandy | |
| 3,935,816 A | 2/1976 | Lawrence | |
| 3,948,178 A * | 4/1976 | Luther ..................... | F42B 5/26 102/464 |
| 3,955,506 A | 5/1976 | Luther et al. | |
| 3,977,326 A | 8/1976 | Anderson et al. | |
| 3,983,990 A | 10/1976 | Gardy et al. | |
| 3,990,366 A | 11/1976 | Scanlon | |
| 3,999,482 A | 12/1976 | Bilek | |
| 4,004,491 A | 1/1977 | Seeling | |
| 4,007,686 A * | 2/1977 | Hugonet .................. | F42B 7/06 102/467 |
| 4,038,923 A * | 8/1977 | Cole ........................ | F42B 5/105 102/432 |
| 4,140,058 A * | 2/1979 | Ballreich ................. | B29C 65/08 102/466 |
| 4,147,107 A * | 4/1979 | Ringdal ................... | F42B 5/307 102/467 |
| 4,165,943 A | 8/1979 | Beach et al. | |
| 4,173,186 A * | 11/1979 | Dunham ................... | F42B 5/02 102/430 |
| 4,187,271 A | 2/1980 | Rolston et al. | |
| 4,359,925 A | 11/1982 | Abet et al. | |
| 4,469,027 A | 9/1984 | Burns et al. | |
| 4,474,102 A | 10/1984 | Tassie | |
| 4,498,396 A | 2/1985 | Berube | |
| 4,546,704 A | 10/1985 | Ballreich et al. | |
| 4,553,479 A | 11/1985 | Willoughby | |
| 4,562,768 A | 1/1986 | Weinfurth et al. | |
| H000061 H | 5/1986 | Yuhash et al. | |
| 4,593,621 A * | 6/1986 | Buchner .................. | F42B 5/30 102/430 |
| 4,620,485 A | 11/1986 | Bertiller | |
| 4,683,170 A | 7/1987 | Tse et al. | |
| 4,697,523 A | 10/1987 | Saxby | |
| 4,719,859 A | 1/1988 | Ballreich et al. | |

(56) References Cited

U.S. PATENT DOCUMENTS

| | | | |
|---|---|---|---|
| 4,726,296 A * | 2/1988 | Leshner | F42B 5/307 |
| | | | 102/430 |
| 4,738,202 A | 4/1988 | Hebert | |
| 4,790,231 A | 12/1988 | Stoner | |
| 4,803,926 A | 2/1989 | Barton et al. | |
| 4,809,612 A | 3/1989 | Ballreich et al. | |
| 4,841,837 A | 6/1989 | Novet | |
| 5,021,206 A * | 6/1991 | Stoops | F42B 5/313 |
| | | | 102/466 |
| 5,033,386 A | 7/1991 | Vatsvog | |
| 5,063,853 A | 11/1991 | Bilgeri | |
| 5,151,555 A | 9/1992 | Vatsvog | |
| 5,165,040 A | 11/1992 | Andersson et al. | |
| 5,233,928 A | 8/1993 | Ducros et al. | |
| 5,237,930 A | 8/1993 | Belanger et al. | |
| 5,259,288 A | 11/1993 | Vatsvog | |
| 5,259,319 A | 11/1993 | Dravecky et al. | |
| 5,265,540 A * | 11/1993 | Ducros | F42B 5/045 |
| | | | 102/434 |
| 5,277,119 A | 1/1994 | Ricco | |
| 5,359,937 A | 11/1994 | Dittrich | |
| 5,460,096 A | 10/1995 | Kothe | |
| 5,492,063 A | 2/1996 | Dittrich | |
| 5,507,232 A | 4/1996 | Valdez | |
| 5,563,365 A | 10/1996 | Dineen et al. | |
| 5,616,642 A | 4/1997 | West et al. | |
| 5,653,563 A | 8/1997 | Ernst et al. | |
| 5,677,505 A | 10/1997 | Dittrich | |
| 5,703,322 A | 12/1997 | Tidman | |
| 5,708,231 A | 1/1998 | Koon | |
| 5,750,918 A * | 5/1998 | Mangolds | F42B 12/66 |
| | | | 102/213 |
| 5,770,815 A | 6/1998 | Watson | |
| 5,893,959 A | 4/1999 | Muellich | |
| 5,969,288 A | 10/1999 | Baud | |
| 6,048,379 A | 4/2000 | Bray et al. | |
| 6,074,454 A | 6/2000 | Abrams et al. | |
| 6,101,949 A | 8/2000 | Maucourt et al. | |
| 6,131,519 A * | 10/2000 | Thiesen | F42B 5/285 |
| | | | 102/469 |
| 6,164,209 A * | 12/2000 | Best | F42B 5/307 |
| | | | 102/439 |
| 6,257,149 B1 | 7/2001 | Cesaroni | |
| 6,283,035 B1 | 9/2001 | Olson et al. | |
| 6,367,386 B1 | 4/2002 | Brede et al. | |
| 6,439,123 B1 | 8/2002 | Dionne et al. | |
| 6,523,476 B1 | 2/2003 | Riess et al. | |
| 6,539,874 B2 | 4/2003 | Weise | |
| 6,584,909 B2 | 7/2003 | Brede et al. | |
| 6,598,536 B2 | 7/2003 | Burri | |
| 6,600,002 B2 | 7/2003 | Sanderson et al. | |
| 6,748,870 B2 | 6/2004 | Heidenreich et al. | |
| 6,752,084 B1 | 6/2004 | Husseini et al. | |
| 6,832,557 B2 | 12/2004 | Torsten | |
| 6,845,716 B2 | 1/2005 | Husseini et al. | |
| 6,862,993 B1 | 3/2005 | Cudazzo | |
| 6,886,467 B1 | 5/2005 | Haeselich | |
| 7,004,074 B2 * | 2/2006 | Van Stratum | F42B 5/02 |
| | | | 102/430 |
| 7,032,492 B2 | 4/2006 | Meshirer | |
| 7,059,234 B2 | 6/2006 | Husseini | |
| 7,086,336 B2 | 8/2006 | Smalley, Jr. et al. | |
| 7,165,496 B2 | 1/2007 | Reynolds | |
| 7,204,191 B2 | 4/2007 | Wiley et al. | |
| 7,213,519 B2 * | 5/2007 | Wiley | B29C 65/02 |
| | | | 102/464 |
| 7,231,519 B2 | 6/2007 | Joseph et al. | |
| 7,406,908 B1 | 8/2008 | Goon et al. | |
| 7,441,504 B2 | 12/2008 | Husseini et al. | |
| 7,610,858 B2 | 11/2009 | Chung | |
| 7,938,067 B2 | 5/2011 | Dindl | |
| 8,087,359 B2 | 1/2012 | Sauvestre | |
| 8,146,281 B2 | 4/2012 | Zimmerman | |
| 8,151,683 B2 | 4/2012 | Dick et al. | |
| 8,240,252 B2 | 8/2012 | Maljkovic et al. | |
| 8,342,072 B2 | 1/2013 | Abbott | |
| 8,443,730 B2 | 5/2013 | Padgett | |
| 8,522,684 B2 * | 9/2013 | Davies | F42B 5/307 |
| | | | 102/466 |
| 8,573,126 B2 * | 11/2013 | Klein | F42B 5/307 |
| | | | 102/430 |
| 2003/0019385 A1 | 1/2003 | Leasure et al. | |
| 2003/0167952 A1 | 9/2003 | Heidenreich et al. | |
| 2003/0172775 A1 | 9/2003 | Amick | |
| 2004/0011237 A1 | 1/2004 | Khvichia et al. | |
| 2004/0226472 A1 * | 11/2004 | Oda | B60R 21/2644 |
| | | | 102/205 |
| 2004/0237827 A1 | 12/2004 | Smalley, Jr. et al. | |
| 2005/0188879 A1 | 9/2005 | Wiley et al. | |
| 2005/0188883 A1 | 9/2005 | Husseini et al. | |
| 2005/0257711 A1 | 11/2005 | Husseini et al. | |
| 2006/0011087 A1 | 1/2006 | Husseini et al. | |
| 2006/0102041 A1 | 5/2006 | Wiley et al. | |
| 2006/0207464 A1 | 9/2006 | Maljkovic et al. | |
| 2007/0193465 A1 * | 8/2007 | Stevens | F42B 3/107 |
| | | | 102/202.1 |
| 2007/0214992 A1 | 9/2007 | Dittrich | |
| 2007/0261587 A1 * | 11/2007 | Chung | F42B 5/313 |
| | | | 102/469 |
| 2008/0245219 A1 | 10/2008 | Moucheboeuf et al. | |
| 2009/0044717 A1 | 2/2009 | Husseini et al. | |
| 2009/0114109 A1 * | 5/2009 | Overton | F42B 3/103 |
| | | | 102/200 |
| 2009/0151710 A1 | 6/2009 | Zimmerman | |
| 2009/0249947 A1 | 10/2009 | Coiffet et al. | |
| 2010/0056687 A1 | 3/2010 | Diakoumakos et al. | |
| 2010/0275804 A1 | 11/2010 | Trivette | |
| 2010/0282112 A1 | 11/2010 | Battaglia | |
| 2010/0305261 A1 | 12/2010 | Maljkovic et al. | |
| 2011/0000391 A1 | 1/2011 | Heitmann | |
| 2011/0179965 A1 * | 7/2011 | Mason | F42B 5/307 |
| | | | 102/467 |
| 2011/0214583 A1 | 9/2011 | Dutch | |
| 2011/0252999 A1 | 10/2011 | Carlson et al. | |
| 2011/0290143 A1 | 12/2011 | Heitmann et al. | |
| 2012/0024183 A1 * | 2/2012 | Klein | F42B 5/307 |
| | | | 102/467 |
| 2012/0060716 A1 * | 3/2012 | Davies | F42B 5/26 |
| | | | 102/469 |
| 2012/0111219 A1 | 5/2012 | Burrow | |
| 2012/0144712 A1 | 6/2012 | Rostocil | |
| 2012/0174813 A1 | 7/2012 | Battaglia | |
| 2012/0180687 A1 | 7/2012 | Padgett | |
| 2012/0180688 A1 | 7/2012 | Padgett | |
| 2012/0318128 A1 | 12/2012 | Gotie | |
| 2013/0014664 A1 | 1/2013 | Padgett | |
| 2013/0025490 A1 | 1/2013 | Burczynski | |
| 2013/0186294 A1 * | 7/2013 | Davies | F42B 5/307 |
| | | | 102/467 |
| 2014/0060372 A1 | 3/2014 | Padgett | |
| 2014/0069290 A1 | 3/2014 | Padgett et al. | |
| 2014/0130699 A1 * | 5/2014 | Peterson | F41A 3/00 |
| | | | 102/520 |

\* cited by examiner

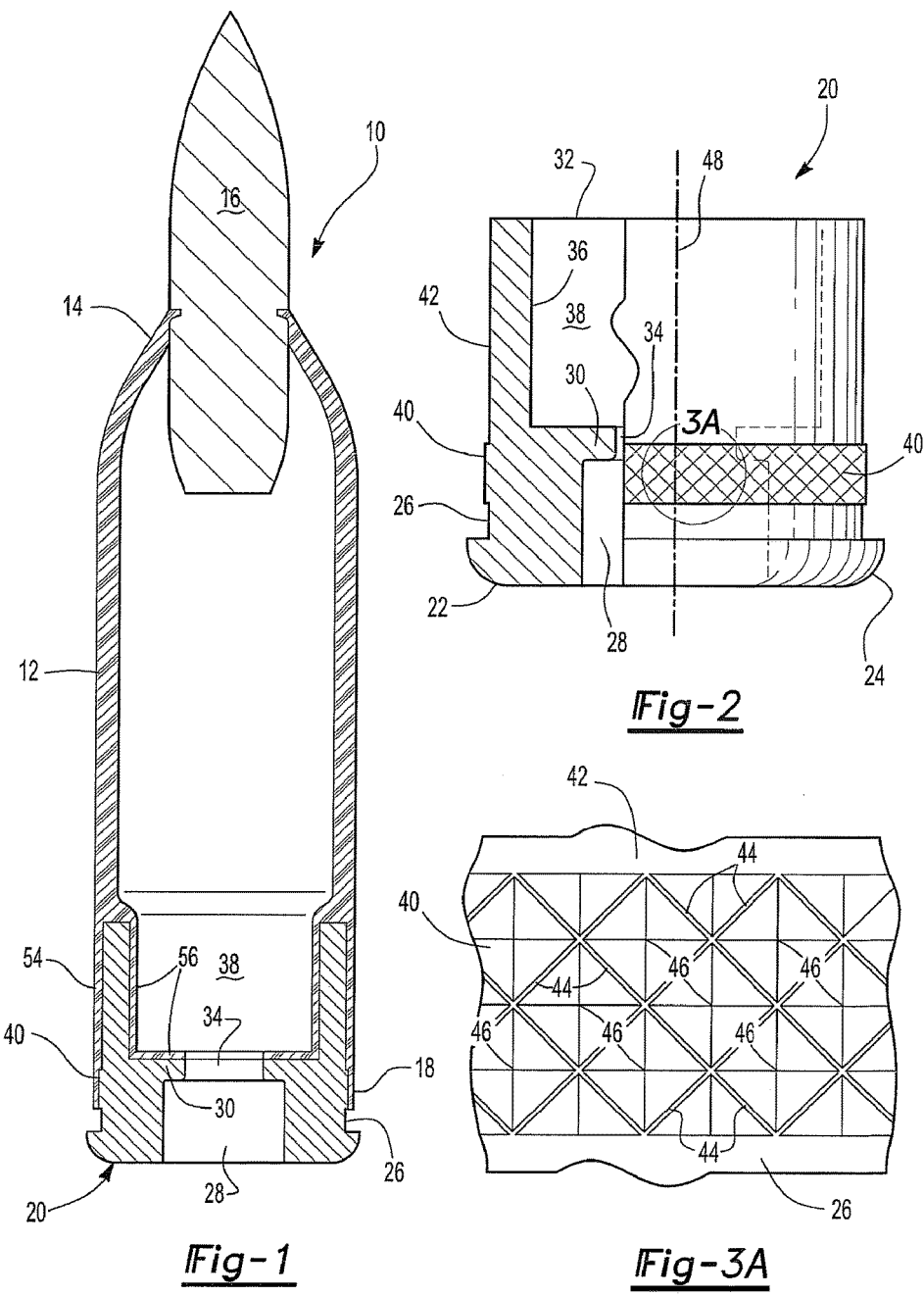

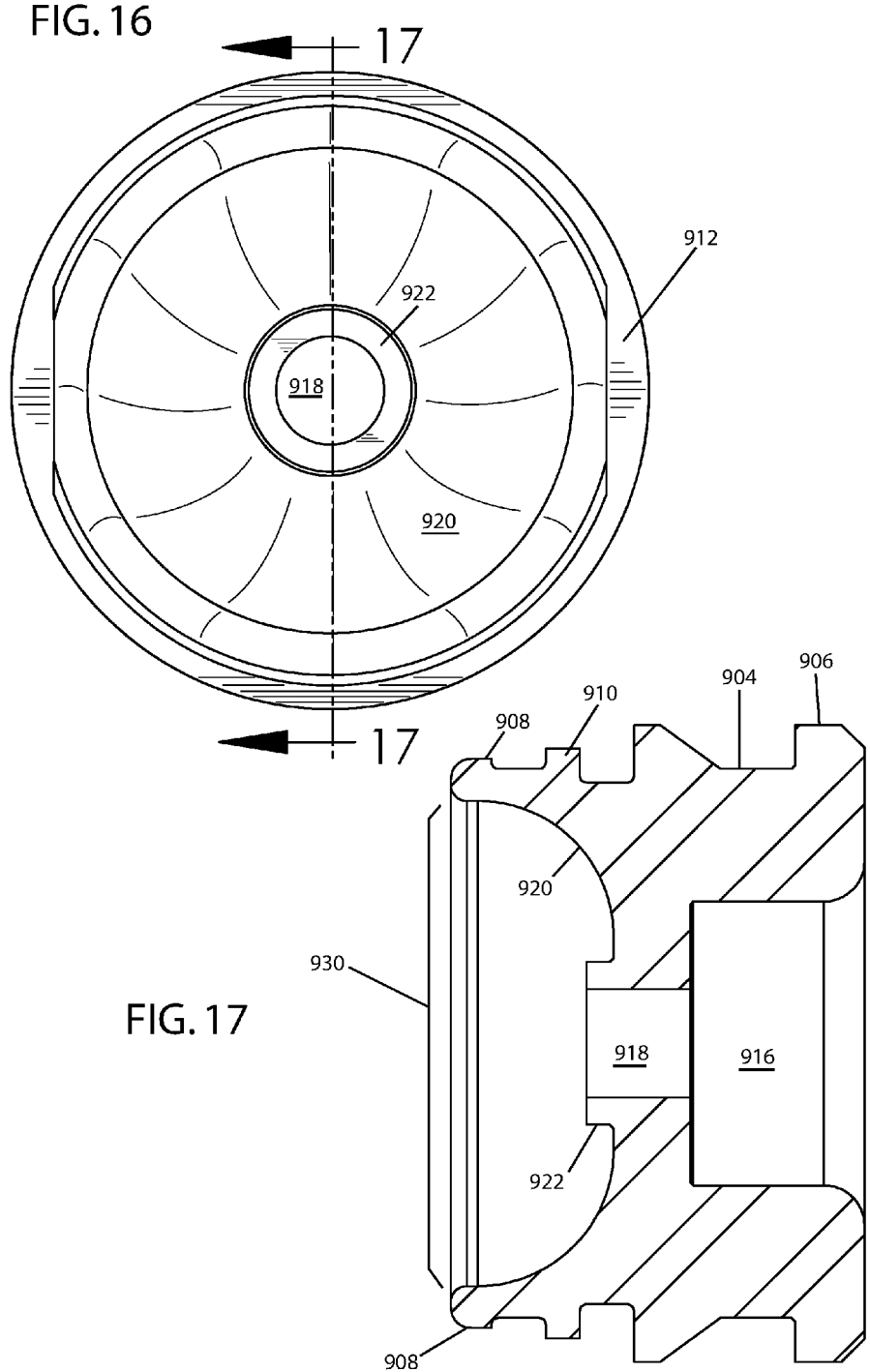

BASE INSERT FOR POLYMER AMMUNITION CARTRIDGES

CROSS-REFERENCE TO RELATED APPLICATIONS

This application is a continuation of U.S. application Ser. No. 14/482,843, filed Sep. 10, 2014 which in turn is a continuation of U.S. application Ser. No. 14/041,709, filed Sep. 30, 2013 which in turn is a continuation of U.S. Pat. No. 8,573,126, filed on Jul. 30, 2010, and issued on Nov. 5, 2013.

U.S. application Ser. No. 14/482,843, filed Sep. 10, 2014 is also a continuation of U.S. application Ser. No. 13/350,585, filed Jan. 13, 2012 which in turn claims priority to U.S. Provisional Application No. 61/433,170, filed Jan. 14, 2011.

U.S. application Ser. No. 14/482,843, filed Sep. 10, 2014 is further a continuation of U.S. Pat. No. 8,875,633, filed Nov. 4, 2014, filed Apr. 17, 2013, and issued on Nov. 4, 2014 which in turn is a divisional application of U.S. Pat. No. 8,443,730, filed Jan. 13, 2012, and issued May 21, 2013, which claims priority to U.S. Provisional Application Ser. No. 61/433,170, filed Jan. 14, 2011, U.S. Provisional Application Ser. No. 61/509,337, filed Jul. 19, 2011, U.S. Provisional Application Ser. No. 61/532,044, filed Sep. 7, 2011, and U.S. Provisional Application Ser. No. 61/555,684, filed Nov. 4, 2011.

U.S. application Ser. No. 14/482,843, filed Sep. 10, 2014 is a continuation of U.S. Pat. No. 9,194,680, filed Aug. 15, 2014, and issued on Nov. 24, 2015, which in turn is a divisional application of U.S. Pat. No. 8,807,008, filed Mar. 15, 2013, and issued Aug. 19, 2014, which in turn is a Continuation-In-Part of U.S. Pat. No. 8,443,730, filed Jan. 13, 2012, and issued May 21, 2013, which claims priority to U.S. Provisional Application Ser. No. 61/433,170, filed Jan. 14, 2011, U.S. Provisional Application Ser. No. 61/509,337, filed Jul. 19, 2011, U.S. Provisional Application Ser. No. 61/532,044, filed Sep. 7, 2011, and U.S. Provisional Application Ser. No. 61/555,684, filed Nov. 4, 2011.

All of the above applications are incorporated herein by reference.

FIELD OF INVENTION

The present subject matter relates to ammunition articles with plastic components such as cartridge casing bodies, and, more particularly, a base insert used with the plastic cartridges.

BACKGROUND

It is well known in the industry to manufacture bullets and corresponding cartridge cases from either brass or steel. Typically, industry design calls for materials that are strong enough to withstand extreme operating pressures and which can be formed into a cartridge case to hold the bullet, while simultaneously resist rupturing during the firing process.

Conventional ammunition typically includes four basic components, that is, the bullet, the cartridge case holding the bullet therein, a propellant used to push the bullet down the barrel at predetermined velocities, and a primer, which provides the spark needed to ignite the powder which sets the bullet in motion down the barrel.

The cartridge case is typically formed from brass and is configured to hold the bullet therein to create a predetermined resistance, which is known in the industry as bullet pull. The cartridge case is also designed to contain the propellant media as well as the primer. However, brass is heavy, expensive, and potentially hazardous. For example, the weight of 0.50 caliber ammunition is about 60 pounds per box (200 cartridges plus links).

The cartridge case, which is typically metallic, acts as a payload delivery vessel and can have several body shapes and head configurations, depending on the caliber of the ammunition. Despite the different body shapes and head configurations, all cartridge cases have a feature used to guide the cartridge case, with a bullet held therein, into the chamber of the gun or firearm.

The primary objective of the cartridge case is to hold the bullet, primer, and propellant therein until the gun is fired. Upon firing of the gun, the cartridge case seals the chamber to prevent the hot gases from escaping the chamber in a rearward direction and harming the shooter. The empty cartridge case is extracted manually or with the assistance of gas or recoil from the chamber once the gun is fired.

One of the difficulties with polymer ammunition is having enough strength to withstand the pressures of the gases generated during firing. In some instances, the polymer may have the requisite strength, but be too brittle at cold temperatures, and/or too soft at very hot temperatures. Additionally, the spent cartridge is extracted at its base, and that portion must withstand the extraction forces generated from everything from a bolt action rifle to a machine gun.

Hence a need exists for a polymer casing that can perform as well as or better than the brass alternative. A further improvement is the base inserts to the polymer casings that are capable of withstanding all of the stresses and pressures associated with the loading, firing and extraction of the casing.

SUMMARY

The examples of the present invention for an insert for a high strength polymer-based cartridge casing can include an outside, an inside formed within the insert, and a back end disposed at a rear of the cartridge casing. The back end includes a rim and groove disposed around the outside of the insert and a primer pocket disposed inside the back end. Also included is a front end, opposite the back end, having an overmolded area disposed around the outside of the insert above the primer pocket and a basin, having a depth, formed inside the overmolded area. A flash hole can be included inside the insert and communicating between the primer pocket and the basin. The flash hole has a perimeter and a ring disposed around the perimeter of the flash hole, including a height starting at a bottom of the basin, disposed toward the front end, and less than the depth of the basin.

Other examples include where the overmolded area includes a ridge, the ridge comprises one or more keys, and the keys are flat surfaces on the ridge. Alternately, the overmolded area has knurling. A belt can be disposed on the outside of the insert and between the overmolded area and groove. A radiused portion at the front end of the insert and inside the overmolded area can be included. Additionally, the groove and the rim can be dimensioned to a size dictated by a caliber of a projectile loaded in the cartridge casing.

An example of a high strength polymer-based cartridge casing can include an upper component, molded from a polymer, which can have a first end having a mouth, at least a wall between the first end and a second end of the upper component opposite the first end, and an overlap portion extending from the wall near the second end. A lower component, molded from a polymer, can include a tapered portion that engages the overlap portion to join the upper and the lower components, an outer sheath disposed opposite the tapered portion, and a lower bowl disposed between the tapered portion and the outer sheath having a hole therethrough. The insert can have a rim disposed at one end of the insert, an overmolded area formed opposite the rim and engaging the outer sheath to join the insert to the lower component, and a ring formed on an inside of the overmolded area and extending into the hole of the lower component.

Another example can have the insert with a ridge formed on the overmolded area, and a key formed on the ridge. Both the ridge and the key can engage the outer sheath, and the key can have a flat portion, a raised portion, or dimples. Additionally, the lower bowl and the outer sheath can compress against a portion of the overmolded area when under pressure.

An example of a method of making a high strength polymer-based cartridge casing can include the steps of machining an insert having a primer pocket, a flash hole, a ring, and an overmolded area, and molding a lower component using a polymer by molding the polymer over the overmolded area of the insert, and stopping the polymer at the ring. Further, the method can include molding an upper component using a polymer, where the upper can include a first end having a mouth, and a second end opposite the first end. The lower component can be bonded to the upper component at the second end.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1 is a side elevation sectional view of a bullet and cartridge in accordance with an example of the invention;

FIG. 2 is an enlarged partially sectioned view of the base shown in FIG. 1 further illustrating the cross hatching on the outer surface of the annular wall;

FIG. 3A is a highly enlarged view illustrating the diamond shape of the cross hatching shown in FIG. 2;

FIG. 16 is a top plan view thereof; and

FIG. 17 is a cross-sectional view along line 17-17 of FIG. 16.

DETAILED DESCRIPTION

Figure 3B:
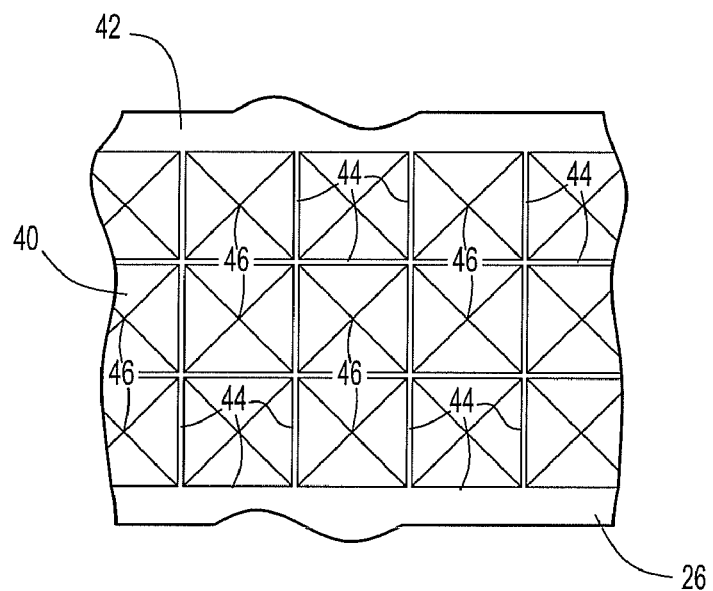
FIG. 3B is a view similar to FIG. 3A illustrating an alternate example of the diamond hatching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present example provides a cartridge case body strong enough to withstand gas pressures that equal or surpass the strength required of brass cartridge cases under certain conditions, e.g. for both storage and handling.

Referring now to FIG. 1, an example of a cartridge 10 for ammunition has a cartridge case 12 with a front end 14 releasably connected in a conventional fashion to a bullet or other weapon projectile 16. The cartridge case can be made from a plastic material, for example a suitable polymer. The rear end 18 of the cartridge case is connected to a base 20.

The base 20 as shown in FIG. 2 has a rear end 22 with an enlarged extraction lip 24 and groove 26 just in front to allow extraction of the base in a conventional fashion. An annular cylindrical wall 36 extends forward from the rear end 22 to the front end 32. A primer cavity 28 is located at the rear end 22 and extends to a radially inwardly extending ledge 30 axially positioned intermediate the rear end 22 and front end 32. A reduced diameter passage 34 passes through the ledge 30. The cylindrical wall 36 defines an open ended main cavity 38 from the ledge 30 to open end 32.

The primer cavity 28 and reduced passage 34 are dimensioned to provide enough structural steel at annular wall 36 and ledge 30 to withstand any explosive pressures outside of the gun barrel. As shown in the drawings, these thicknesses are greater than the wall thickness of the cylindrical wall 36 about the main cavity 38.

The outer surface 42 of the cylindrical wall 36 has a raised knurl section 40. The knurl section 40 is annular, i.e. it extends completely about the outer surface 42 of the annular cylindrical wall 36. The axial position of the knurl is partially aligned with the axial position of the radially inwardly ledge 30.

As clearly shown in FIGS. 2 and 3A, the knurl section 40 has left/right diagonal line knurls 44 which are also referred to as grooves that are cross hatched to form diamond shaped peaks 46. The left and right line knurls 44 are angled with respect to the longitudinal axis 48 of the cartridge.

In another example shown in FIG. 3B, the line knurls 44 are not angled but run either parallel to the axis 48 or transverse with the axis 48 to form the diamond shaped peaks 46.

Figure 4:
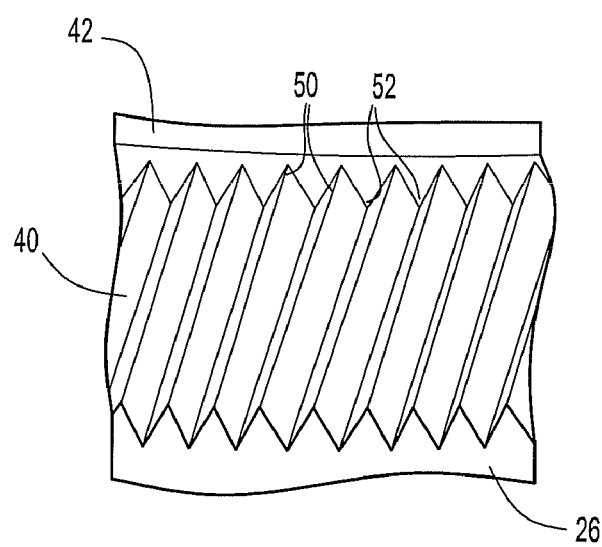
FIG. 4 is a view similar to FIG. 3A illustrating another alternate example of the knurl section at the outer surface of the annular wall.

In another example shown in FIG. 4, there are only angled line knurls 52 that are parallel to each other to form longitudinal and angled ribs 50.

While the dimensions may vary due to different caliber ammunition, one knurl length can range from 0.050 to 0.160 inches extending from above the extractor lip 24 toward the front end 32. The knurl 40 forms a raised pattern which is 0.004 to 0.010 inches above the nominal diameter of the outer surface 42 of the wall 36.

The base can be made by pressure forming carbon steel material. Preferably the carbon steel is cold formed into shape. The carbon steel may for example be 1010 type ranging to 1035 type steel. The knurl section 40 is formed during the heading operation of the formed steel insert. No corrosion coating is needed. The base after being cold formed may be heat treated.

After the base 20 is cold formed and optionally heat treated, the plastic cartridge case is molded about the base 20 with an outer flange 54 molded over the outer surface 42 and adhering and positively interlocking with the knurl section 40. An inner flange 56 can be molded within the cylindrical wall 34 and overlie the radially inward extending ledge 30 such that wall 36 becomes sandwiched between the two flanges 54, 56.

Alternatively, the outer flange 54 may be ultrasonically connected to the base. When ultrasonic welding is used, the angled groove hatching shown in FIG. 4 is preferred. The knurl replaces the machined retaining groove which previously was required to mechanically bond the polymer to the steel insert.

Furthermore, the integrity of the cartridge 10 particularly at the junction at the base 20 and polymer cartridge 12 at flanges 54 and 56 is improved and a free gas path between the molded polymer and steel is prevented upon expansion of the polymer material during firing of the cartridge. By eliminating the free gas path, a rapid burn through is also eliminated which otherwise can result in immediate cartridge failure and a jammed weapon.

Due to different expansion rates of the relatively softer polymer material of the cartridge case 12 compared to the steel material of the base 20, the knurl form embedded into the polymer allows the polymer to expand without opening a free gas path. Furthermore, as expansion of the knurl subsequently occurs, the knurl is forced deeper into the overmolded polymer which cannot expand further beyond the clearance allowed by the breech of the weapon. Thus, the mechanical bond between the overmolded formed base with the cartridge case 12 is maintained from its pre-fired dimensions to its after fired dimensions in the weapon.

Figure 5:
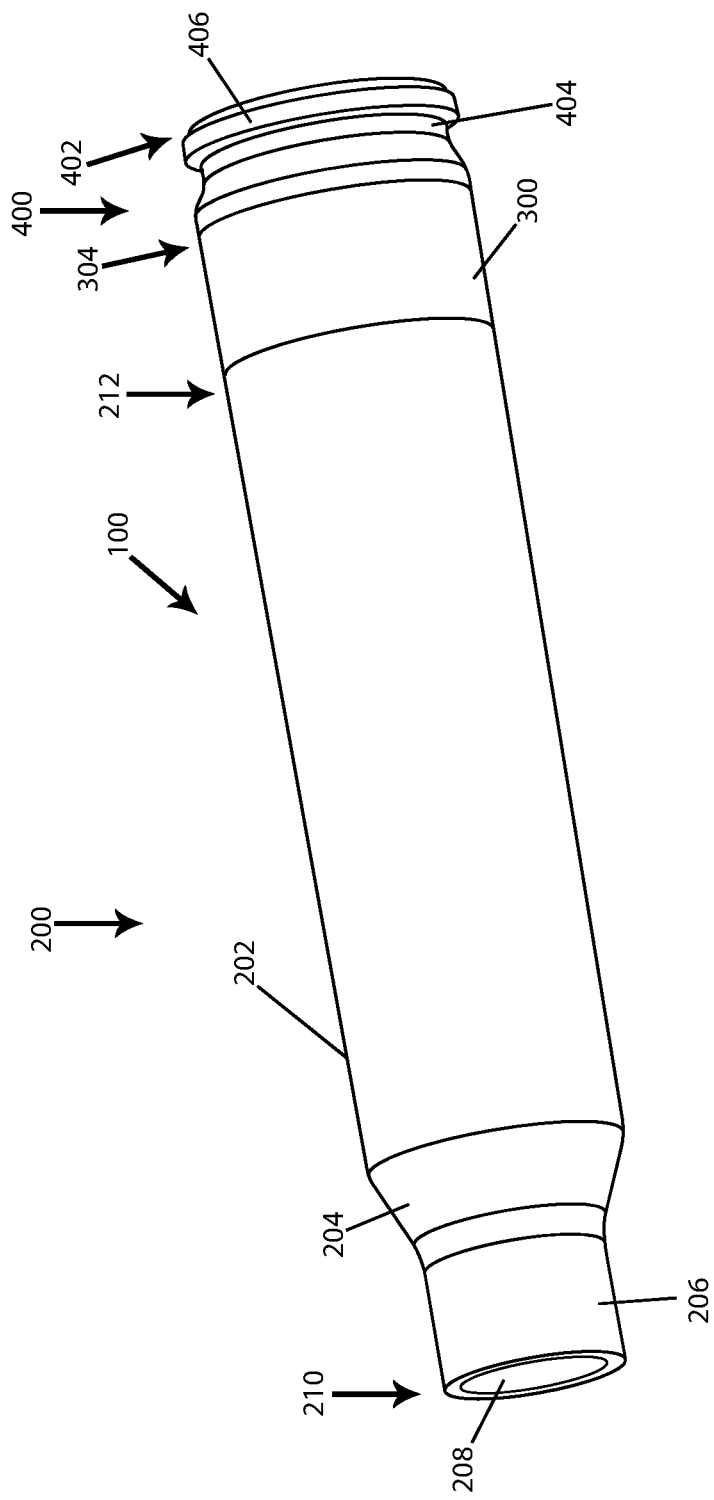
FIG. 5 is a side perspective view of the outside of another example of a cartridge case.

Reference now is made in detail to the examples illustrated in the other accompanying drawings and discussed below. FIG. 5 further illustrates an example of a cartridge case 100. The cartridge case 100 includes an upper component 200, a lower component 300, and an insert 400. In this example, the upper component 200 and the lower component 300 are made of a polymer, while insert 400 is made from a metal, an alloy of metals, or an alloy of a metal and a non-metal. Regardless of materials, the outer dimensions of the cartridge case 100 are within the acceptable tolerances for whatever caliber firearm it will be loaded into.

The polymer used is lighter than brass. A glass-filled high impact polymer can be used where the glass content is between 0%-50%, preferably between 5% and 20%. In another example the glass content can be 10% and another of 15%. An example of an impact modified nylon polymer without the glass content is BASF's Capron® BU50I. The insert 400 can be made of steel, and, in an example, heat treated carbon steel, 4140. The 4140 steel has a rating on the Rockwell "C" scale ("RC") hardness of about 20 to about 50. However, any carbon steel with similar properties, other metals, metal alloys or metal/non-metal alloys can be used to form the insert. Heat treating a lower cost steel alloy to improve its strength is a point of distinction from the prior art, which have typically opted for more expensive alloys to deal with the strength and ductility needed for a cartridge casing application.

In an example, the combination of the upper component 200 and the lower component 300 are made of 10% glass-filled high impact polymer combined with the insert 400 made of heat treated 4140 steel results in a cartridge that is approximately 50% lighter than a brass formed counterpart. This weight savings in the unloaded cartridge produces a loaded cartridge of between 25%-30% lighter than the loaded brass cartridge depending on the load used, i.e. which bullet, how much powder, and type of powder used.

The upper component 200 includes a body 202 which transitions into a shoulder 204 that tapers into a neck 206 having a mouth 208 at a first end 210. The upper component 200 joins the lower component 300 at an opposite, second end 212. The lower component 300 joins the upper component 200 at a lower component first end 302 (see FIG. 6). The upper 200 and lower 300 components are adhered by an ultraviolet (UV) light weld process or heat cured resin, a spin weld, or an ultrasonic weld.

At a second end 304 of the lower component 300, the lower component is joined to the insert 400. In one example, the upper component 200 and the lower component 300 are molded in separate molds. When the lower component 300 is molded, it is molded over the insert 400. This is a partial molding over, since the lower component 300 does not completely cover the insert 400.

A back end 402 of the insert 400 is also the rear end of the casing 100. The insert 400 is formed with an extraction groove 404 and a rim 406. The groove 404 and rim 406 are dimensioned to the specific size as dictated by the caliber of the ammunition. The insert 400 can be formed by turning down bar stock to the specific dimensions or can be cold formed and turned to produce the final design.

Figure 6:
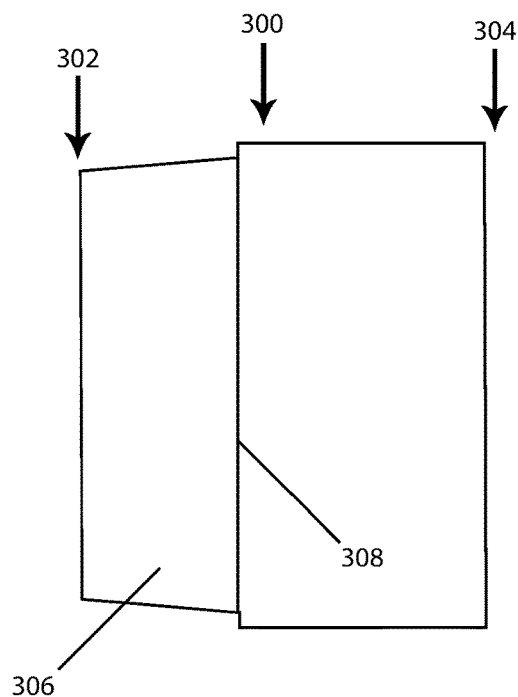
FIG. 6 is a side view of the lower component without the upper component and insert.
Figure 7:
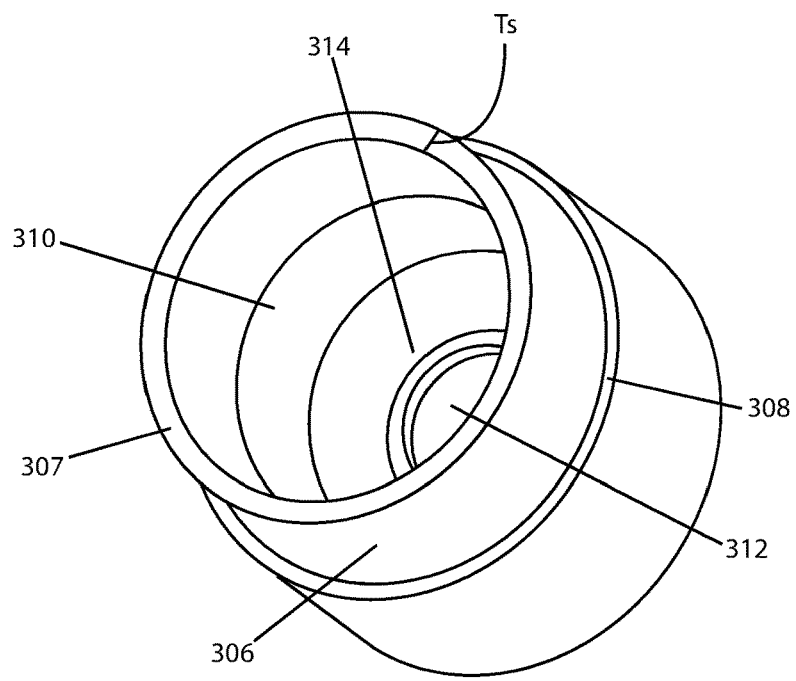
FIG. 7 is a bottom front perspective view of the lower component of FIG. 6.
Figure 8:
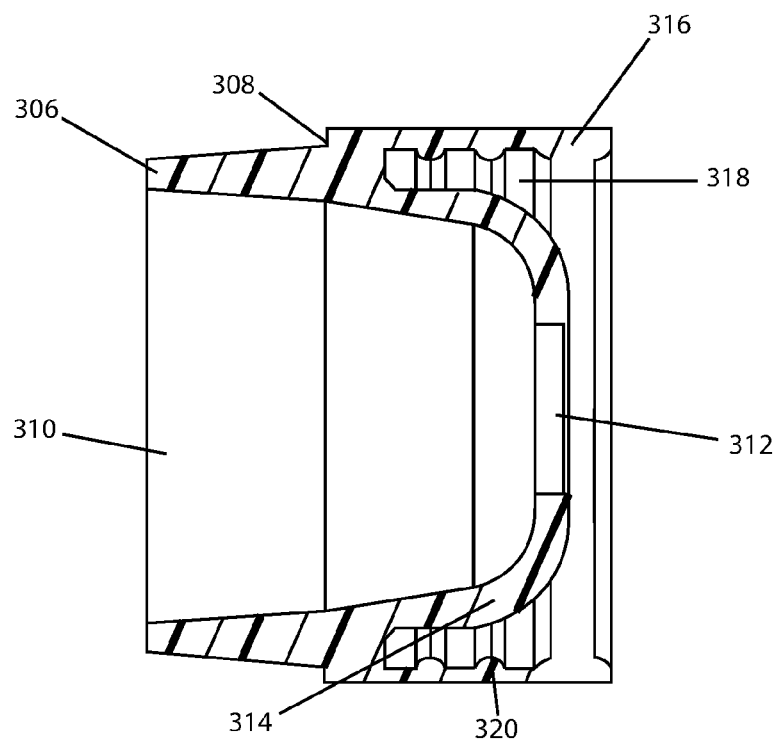
FIG. 8 is a longitudinal cross-section view of the lower component of FIG. 6.

FIGS. 6-8 illustrate that the lower component 300 has a tapered portion 306 starting at the lower component first end 302 and ending at a collar 308. The slope of the tapered portion 306 approximately matches the slope of in the upper 200 so the two can slide over each other to engage the upper 200 and lower 300 components. The tapered portion 306 ends in a flat seat 307. The seat 307 can have a thickness Ts which is about equal to the thickness of the wall A width of the collar 308 matches second thickness of the upper, so that the outer diameter of the cartridge 100 remains constant past the transition point between the upper 200 and lower 300 components.

An inner wall 310 of the lower component 300 can be formed straight. In the illustrated example in FIG. 8, the inner wall 310 forms a bowl shape with a hole 312 at the bottom. The hole 312 is formed as a function of the interface between the lower component 300 and the insert 400, and its formation is discussed below. As the inner wall 310 slopes inward to form the bowl shape, it forks and forms an inner bowl 314 and an outer sheath 316. The gap 318 that is formed between the inner bowl 314 and the outer sheath 316 is the space where a portion of the insert 400 engages the lower component 300. As noted above, in one example, the lower component 300 is molded over a portion of the insert 400 to join the two parts.

Figure 9:
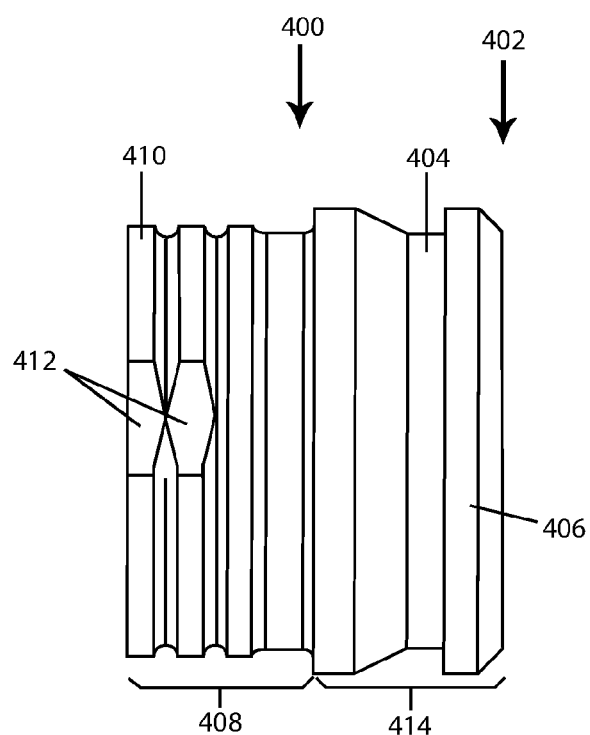
FIG. 9 is a side view of an example of an insert without the upper and lower components.

The insert 400, as illustrated in FIG. 9, includes an overmolded area 408, where the outer sheath 316 engages the insert 400 in the gap 318. The overmolded area 408 has one or more ridges 410. The ridges 410 allow the polymer from the outer sheath 316, during molding, to forms bands 320 (see, FIG. 8) in the gap 318. The combination of the ridges 410 and bands 320 aid in resisting separation between the insert 400 and the lower component 300. The resistance is most important during the extraction of the cartridge from the firearm by an extractor (not illustrated).

The overmolded area 408 also includes one or more keys 412. The keys 412 are flat surfaces on the ridges 410. These keys 412 prevent the insert 400 and the lower portion 300 from rotating in relation to one another, i.e. the insert 400 twisting around in the lower portion 300. The form of the keys 412 are only an example thereof, and other methods can be used to prevent the relative rotation of the two parts. Other examples can be any surface changes, i.e. dimples, teeth, etc., that perform the same non-rotational function. See example above.

Below the overmolded area 408, toward the back end 402, is a self reinforced area 414. This portion extends to the back end 402 of the insert 400 and includes the extraction groove 404, a stop 405, and rim 406. The self reinforced area 414 must, solely by the strength of its materials, withstand the forces exerted by the pressures generated by the gasses when firing the bullet and the forces generated by the extractor. In the present example, the self reinforced area 414 withstands these forces because it is made of a heat treated metal or a metal/non-metal alloy.

Figure 10:
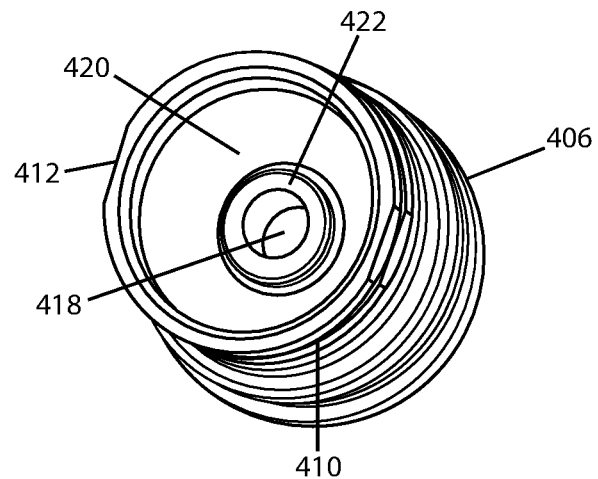
FIG. 10 is a bottom front perspective view of the insert of FIG. 8.
Figure 11:
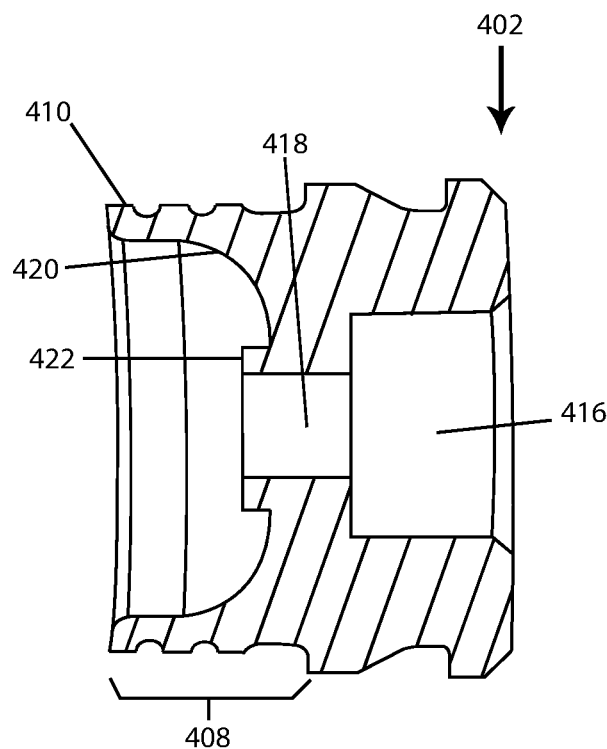
FIG. 11 is a longitudinal cross-section view of the insert of FIG. 8.

FIGS. 10 and 11 illustrate an example of the inside of the insert 400. Open along a portion of the back end 402 and continuing partially toward the overmolded area 408 is a primer pocket 416. The primer pocket 416 is dimensioned according to the standards for caliber of the cartridge case and intended use. A primer (not illustrated) is seated in the primer pocket 416, and when stricken causes an explosive force that ignites the powder (not illustrated) present in the upper 200 and lower 300 components.

Forward of the primer pocket 416 is a flash hole 418. Again, the flash hole 418 is dimensioned according to the standards for the caliber of the cartridge case and intended use. The flash hole 418 allows the explosive force of the primer, seated in the primer pocket 418, to communicate with the upper 200 and lower 300 components.

Forward of the primer pocket 416 and inside the overmolded area 408 is basin 420. The basin 420 is adjacent to and outside of the inner bowl 314 of the lower component 300. The basin 420 is bowl shaped, wherein the walls curve inwards toward the bottom. The bottom of the basin 420 is interrupted by a ring 422. The ring 422 surrounds the flash hole 418 and extends into the basin 420. It is the presence of the ring 422 that forms the hole 312 in the inner bowl 314 of the lower component 300.

The ring 422 can act as a "shutoff" for the mold during the overmolding process. The ring 422 prevents the molten plastic from flowing into the flash hole 418. This also provides a seal between the inner bowl 314 and the ring 422. Again, there are many examples for the formation of the ring 422, a simple vertical edge, a steep upslope, an overhang, etc. The use of the ring 422 assists in creating the "pinching" effect described below with regards to FIG. 14.

Figure 12:
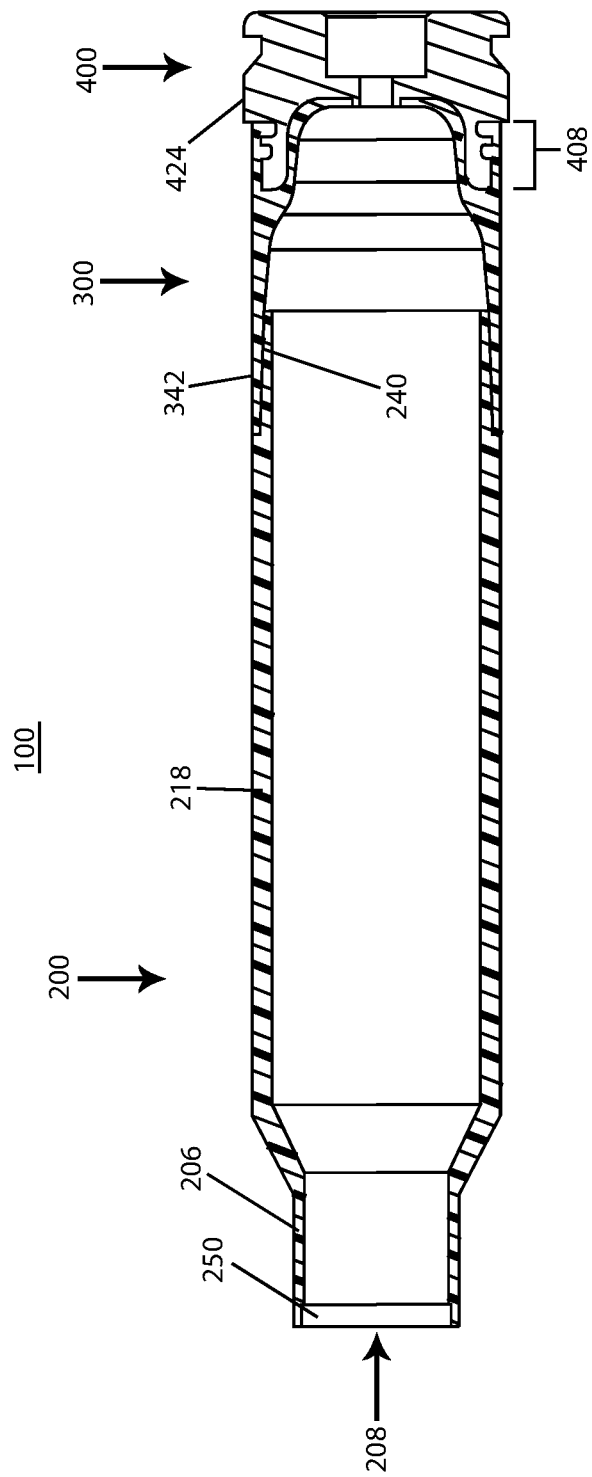
FIG. 12 is a longitudinal cross-section view of example of belted insert.

The example of FIG. 12 also includes a belted insert 400. The belt 424 can be used to provide headspacing and has a larger outer diameter than the lower component's outer wall. Belted cartridges are used primarily in "magnum" rounds and in some cases to prevent the higher-pressure magnum cartridge from accidentally being chambered in a gun with a chamber of similar size. The present example can also use the belt 424 as stopping point of the overmolded area 408. Another feature of the insert are two ridges 410, to reduce the amount of the insert that is required to be overmolded by the lower component 300. The two ridges can be used without the belt. As noted in the discussion of FIG. 9, the belt 424 presents a number of the same benefits as the stop 405. Additional examples can also include the stop 405 and the belt 424, wherein one comes before the other based on where the belt's larger diameter is needed for its "preventive" purposes.

Figure 13:
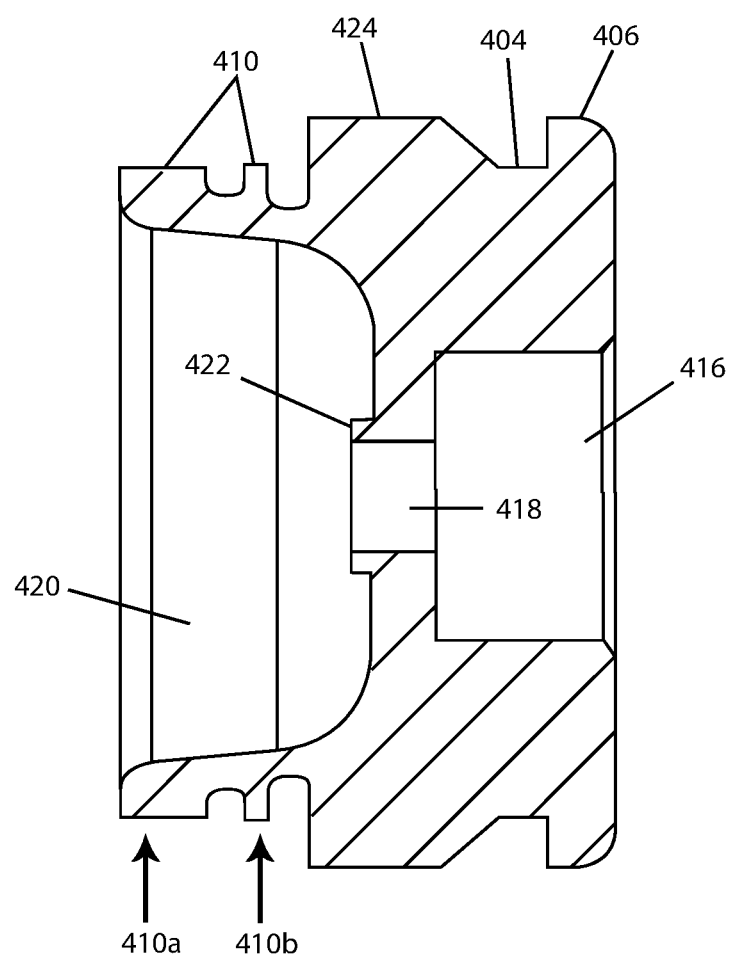
FIG. 13 is a longitudinal cross-section view of the insert of FIG. 12.

FIG. 13 illustrates an example of the insert 400 having a belt 424. The belt 424 can be used with any number of ridges 410. The present example uses two ridges 410, instead of three ridges 410 as illustrated and discussed above. In the illustrated two ridge design, the first ridge 410A is wider than the second ridge 410B, to provide the additional surface area that is lacking if there was three or more ridges. The width differential can be approximately 2 to 4 times larger. The ridged design increases the pull strength to separate the insert 400 from the lower component 300, providing additional strength to extract the empty cartridge after firing. Further to the two ridge example, it is easier to machine the insert than the three ridge version, but both are still feasible.

Turning now to an example of forming the lower component 300 and insert 400 of the cartridge case 100. The insert 400 is formed from a metal, metal alloy or metal/non-metal alloy. It can be formed by any known method in the art, including milling, hydroforming, casting, etc. All of the features of the groove 404, rim 406, ridges 410, keys 412, primer pocket 416, flash hole 418, basin 420 and ring 422 can be formed at the same time or over a series of steps. The insert 400 is then placed is a mold to be overmolded by the lower component 300.

As the lower component 300 is overmolded onto the insert 400, the liquid polymer spreads along two paths. One path spreads to the outside of the insert 400, engages around the ridges 410 and forms the bands 320 and sheath 316. The second path spreads to the inside of the insert 400 and flows down basin 420. This polymer flow forms the inner bowl 314. The second polymer flow is stopped by ring 422 which prevents any of the polymer from flowing into the flash hole 418. This has the effect of forming hole 312. It is the shape of the basin 420 and the ring 422 that act as a mold for a portion the inner bowl 314 and the hole 312. Further, preventing polymer from flowing into the flash hole 418 maintains the proper dimensions of the flash hole 418 which is important in igniting the powder and makes for a more reliable cartridge.

The remainder of the inner wall 310, the tapered portion 306 and the collar 308 of the lower component 300 are also formed during the overmolding process, but through the forms of a mold and not as a function of the contours of the insert 400, in this particular example.

The specific outer dimensions of the three elements and certain inner dimensions (e.g. flash hole 418, and primer pocket 416) are dictated by the caliber and type of the firearm and type of ammunition. The cartridge casing 100 of the present example is designed to be used for any and all types of firearms and calibers, including pistols, rifles, manual, semi-automatic, and automatic firearms.

The present cartridge casing 100, as well as a typical cartridge casing made of brass, is typically not designed to withstand the pressures generated by the explosion of the powder within when the cartridge is outside the chamber of a firearm. Once inside the chamber, as the cartridge casing expands under the pressures of the explosion, the walls of the chamber support the casing and contain the pressures. This happens without rupturing the casing. The present examples take advantage of this fact to provide a stronger, lighter weight casing that improves accuracy and decreases the amount of powder needed.

Figure 14:
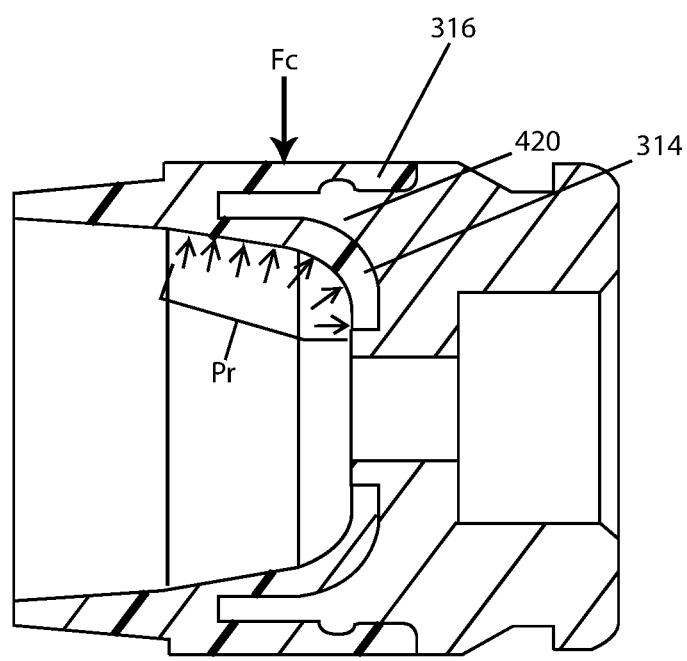
FIG. 14 is a longitudinal cross-section view of the lower component and insert under pressure.

FIG. 14 illustrates one advantage of the overmolded design of the lower component 300 and the insert 400. When the primer is struck, igniting the powder residing in the lower 300 and upper 200 components, the explosion of the powder generates gasses. The gasses cause a pressure that can expand the cartridge casing in both the longitudinal and radial directions. In the present example, radial pressures Pr act on the lower bowl 314 and the inner wall 310. The pressures Pr act normal to whatever surface they encounter. This pressure forces the inner bowl 314 against the basin 420. As the casing expands it encounters the chamber of the firearm, which in turn provides support for the casing. The sheath 316 of the lower component 300 contacts the chamber and provides a counter force Fc to the pressures Pr. The two forces provide a compression force or a "pinching" effect. Thus, the insert 400 engages the lower component 300 with increased strength allowing the overmolded components to stay together under the high pressures. For this example, the compression forces are further used to the advantage that the casing is typically still under pressure when it is removed from the chamber by the extractor (this is very typical when the ammunition is being fired from an automatic weapon). This additional strength helps assure that the cartridge case 100 remains intact as it is extracted.

A further exemplary effect of the pinching forces is that since the inner bowl 314 and basin 420 are forced closer together, this acts like a gasket, preventing the gasses from getting between the lower component 300 and the insert 400. If gases get between the two elements, this could separate the two, leaving the majority of the cartridge casing in the chamber while the insert 400 is extracted. This would cause the firearm to jam and fail.

Below describes another example of manufacturing the polymer casing described above. Portions of the method described below can be performed either in series or in parallel. As an example, the insert 400 can be formed 4140 steel. The 4140 steel can start as bar stock and be machined down and stamped to the proper dimensions. The 4140 steel has a hardness high enough that the material does not require heat treatment after machining. However, the high hardness makes machining more difficult and expensive. Both 12L14 and 1015 steels can be used. Both are "softer" than the 4140 steel and that makes them easier to machine. However, after machining, the inserts need to be heat treated to increase their hardness so as to withstand the stresses during firing. Further, regardless of the steel chosen, the insert can be plated to reduce/resist corrosion. In one example, the insert can be plated with yellow zinc to a thickness of approximately "0.0005".

In a further example of the machining method, the stop 405 and the rim 406 have the same outer diameter. The matching diameters assist in the machining process. These two points provide sufficient surface area to properly hold the insert as its being formed. The transition between the groove 404 and the stop 405 can be a gradual transition with a sloping increase in diameter, or a more direct and steeper angle, even vertical. The step 405 acts as a rear "shutoff" to the overmolded area 408 during molding, so the molten polymer stops short of the extraction groove 404.

Once the insert is formed, the lower component can then be molded. In the example, the lower component is approximately ⅓ the length of a total length of the cartridge. In other examples, the lower component can be upwards of ⅔ of the total length. The length ratio of the upper and lower components do not materially affect the molding process other than to change the size of the mold.

Figure 15:
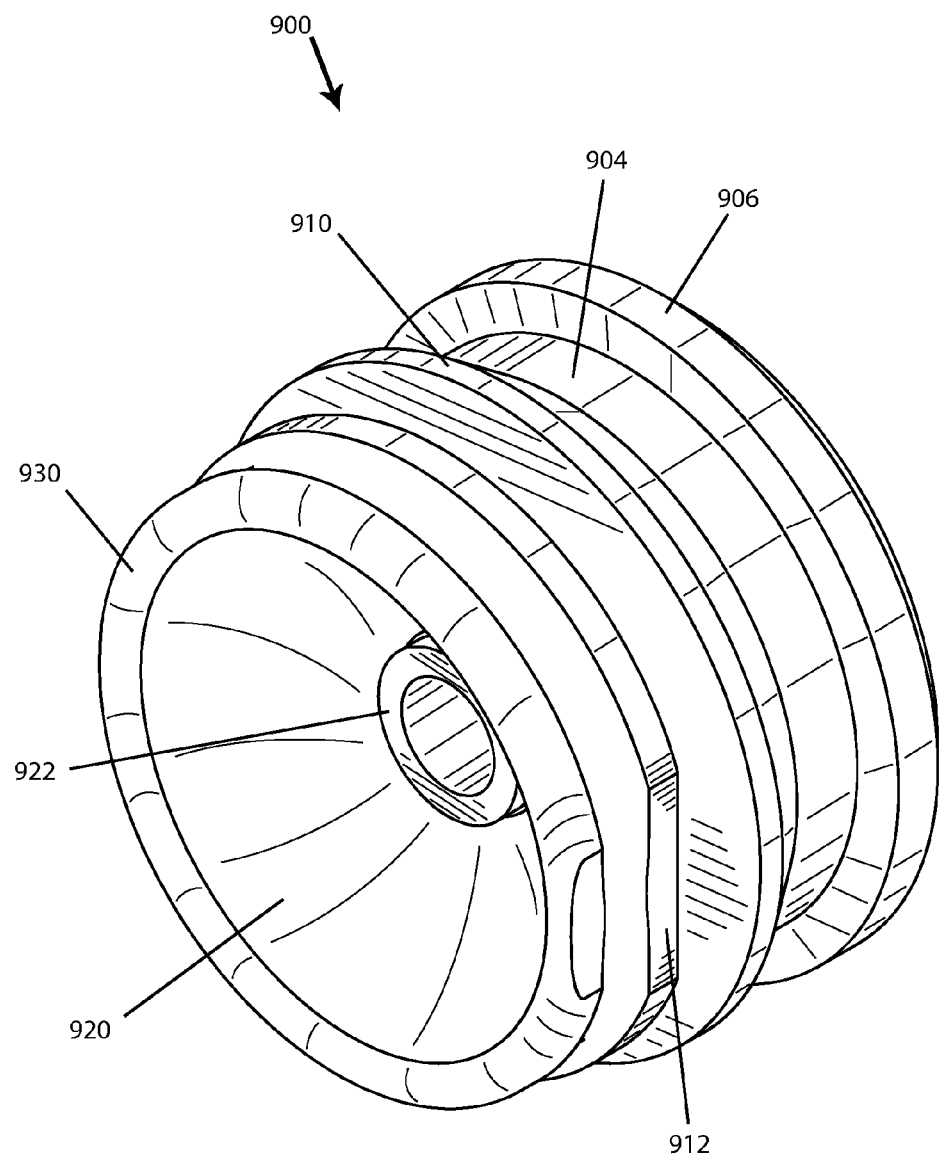
FIG. 15 is a front, top, right perspective view of an example of a radiused insert.

Turning now to an example of a machine gun insert 900, as illustrated in FIGS. 15-17, it includes an overmolded area 908, where a polymer section of the cartridge 200 engages the insert 900. The overmolded area 908 has one or more ridges 910. The ridges 910 allow the polymer, during molding, to forms bands and the combination of the ridges 910 and bands aid in resisting separation between the insert 900 and the polymer section of the cartridge 200. The resistance is most important during the extraction of the cartridge from the machine gun by the extractor.

The overmolded area 908 also includes one or more keys 912. The keys 912, in one example, are flat surfaces on the ridges 910. These keys 912 prevent the insert 900 from rotating within the cartridge, i.e. the insert 900 twisting around in the lower portion 300. The form of the keys 912 are only an example thereof, and other methods can be used to prevent the relative rotation of the two parts. Other examples can be any surface changes, i.e. dimples, teeth, etc., that perform the same non-rotational function. Below the overmolded area 908, is an extraction groove 904 and a rim 906.

FIG. 17 illustrates an example of the inside of the insert 900. A primer pocket 916 can receive a primer (not illustrated) and, when stricken, causes an explosive force that ignites the powder (not illustrated) in the cartridge. Forward of the primer pocket 916 is a flash hole 918. Again, the flash hole 918 is dimensioned according to the standards for the caliber of the cartridge case and intended use. The flash hole 918 allows the explosive force of the primer, seated in the primer pocket 918, to communicate with the remainder of the cartridge.

Forward of the primer pocket 916 and inside the overmolded area 908 is basin 920. The basin 920 is bowl shaped, wherein the walls curve inwards toward the bottom. The bottom of the basin 920 is interrupted by a ring 922. The ring 922 surrounds the flash hole 918 and extends into the basin 920. The ring 922 can act as a "shutoff" for the mold during the overmolding process. The ring 922 prevents the molten plastic from flowing into the flash hole 918.

At the top of the insert 900 is radiused portion 930. The radiused portion 930 is at the top of the insert 900 inside the overmolded area 908. The radiused portion 930 can be curved to any radius but in one example a small radius is necessary, for example 0.015 mm. The radiused portion 930 can, in one example, distribute stressed caused when the cartridge is ejected from a chamber using an ejector. These stresses are magnified when the cartridge is being fired through a machine gun, which is cycling rounds at a very high rate.

The polymer construction of the cartridge case and links provides a feature of reduced friction which leads to reduced wear on the machine gun, further extending its service life. Further, the polymer lightens the weight of the individual cartridge and the belt.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An insert for a high strength polymer-based cartridge casing comprising:
    an outside;
    an inside formed within the insert;
    a back end disposed at a rear of the insert, comprising:
        a rim and groove disposed around the outside of the insert; and
        a primer pocket disposed inside the back end;
    a front end, opposite the back end, comprising:

an overmolded area disposed around the outside of the insert above the primer pocket; and a basin, having a depth, formed inside the overmolded area;

a flash hole, inside the insert and communicating between the primer pocket and basin, comprising a perimeter; and a ring disposed around the perimeter of the flash hole, comprising a height starting at a bottom of the basin, disposed toward the front end, and less than the depth of the basin, wherein the insert is formed from at least one of a metal and metal alloy.

2. The insert for a high strength polymer-based cartridge casing of claim 1, further comprising:

a ridge formed on the overmolded area; and a key formed on the ridge;

wherein the key comprises at least one of a flat portion, a raised portion, or dimples.

* * * * *